US008654938B2

(12) United States Patent
Kurashima

(10) Patent No.: US 8,654,938 B2
(45) Date of Patent: Feb. 18, 2014

(54) RELAY PROCESSING DEVICE, COMMUNICATION TERMINAL, RELAY PROCESSING SYSTEM, RELAY PROCESSING METHOD, AND PROGRAM

(75) Inventor: Akihisa Kurashima, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 13/145,084

(22) PCT Filed: Feb. 2, 2010

(86) PCT No.: PCT/JP2010/000616
§ 371 (c)(1),
(2), (4) Date: Jul. 18, 2011

(87) PCT Pub. No.: WO2010/089999
PCT Pub. Date: Aug. 12, 2010

(65) Prior Publication Data
US 2011/0280389 A1 Nov. 17, 2011

(30) Foreign Application Priority Data
Feb. 3, 2009 (JP) ................................. 2009-023003

(51) Int. Cl.
*H04M 3/436* (2006.01)
(52) U.S. Cl.
USPC ............... 379/88.19; 379/88.21; 379/207.02; 379/207.15; 379/88.01; 379/214.01
(58) Field of Classification Search
USPC ................... 379/88.01, 214.01, 88.21, 88.19, 379/207.15, 207.02
See application file for complete search history.

(56) References Cited

U.S. PATENT DOCUMENTS

| | | | |
|---|---|---|---|
| 6,370,399 B1 * | 4/2002 | Phillips | ......................... 455/564 |
| 6,463,131 B1 * | 10/2002 | French-St. George et al. | ......................... 379/88.23 |
| 7,136,475 B1 * | 11/2006 | Rogers et al. | ............ 379/213.01 |
| 2005/0084084 A1 * | 4/2005 | Cook et al. | ............... 379/142.01 |
| 2007/0092073 A1 * | 4/2007 | Olshansky et al. | ........... 379/232 |

FOREIGN PATENT DOCUMENTS

| | | |
|---|---|---|
| JP | 10-65893 A | 3/1998 |
| JP | 2001111698 A | 4/2001 |
| JP | 2001148750 A | 5/2001 |
| JP | 2002218063 A | 8/2002 |
| JP | 2005197827 A | 7/2005 |
| WO | 2006003758 A | 1/2006 |
| WO | 2008078458 A | 7/2008 |

OTHER PUBLICATIONS

International Search Report for PCT/JP2010/000616 mailed Mar. 9, 2010.

* cited by examiner

*Primary Examiner* — Ahmad Matar
*Assistant Examiner* — Jirapon Intavong
(74) *Attorney, Agent, or Firm* — Sughrue Mion, PLLC

(57) ABSTRACT

When a call from a call terminal to a called terminal is received, a relay processing device transmits calling terminal specific information that specifies the calling terminal to the called terminal by using data communication. The calling terminal specific information, for example, is a phone number of the calling terminal, but may be a user's name of the calling terminal. The called terminal transmits to the relay processing device, connection information that indicates whether or not to respond to the call from the calling terminal. The transmission of the connection information may be performed by any one of voice communication and data communication. The relay processing device connects the phone call between the called terminal and the calling terminal or cuts off the connection between the calling terminal and the relay processing device according to the connection information.

5 Claims, 18 Drawing Sheets

| FIRST PHONE NUMBER | CALLED TERMINAL PHONE NUMBER | E-MAIL ADDRESS |
|---|---|---|
| 03-×××-×××× | 090-1×××-×××× | aaa@..** |
| 03-×××-×××× | 090-1×××-×××× | bbb@..** |
| 03-×××-×××× | 090-1×××-×××× | ccc@..** |
| ⋮ | ⋮ | ⋮ |

PHONE CALL
FROM 03-xxxx-xxxx

IF RESPONDING ↓
050-1111-1111

IF REJECTING ↓
050-1111-1112

PHONE CALL
FROM 03-xxxx-xxxx

RESPOND

REJECT

| CALLED TERMINAL PHONE NUMBER | USER NAME | ATTRIBUTE |
|---|---|---|
| 090-2×××-×××× | △△ | ×× COMPANY |
| 090-2×××-×××× | △× | △□ COMPANY |
| 090-2×××-×××× | ×△ | □□ COMPANY |
| ⋮ | ⋮ | ⋮ |

PHONE CALL FROM
MR. ΔΔ AT xx COMPANY

IF RESPONDING ↓
050−1111−1111

IF REJECTING ↓
050−1111−1112

RELAY PROCESSING DEVICE, COMMUNICATION TERMINAL, RELAY PROCESSING SYSTEM, RELAY PROCESSING METHOD, AND PROGRAM

TECHNICAL FIELD

The present invention relates to a relay processing device relaying a phone call between a call terminal and a called terminal, a communication terminal, a relay processing system, a relay processing method, and a program.

BACKGROUND ART

Recently, a phone call between two communication terminals is performed through a relay processing device. Specifically, a call terminal calls using a phone number of the relay processing device as the phone number of a called terminal, and thus communication between the calling terminal and the relay processing device is established. Then, the relay processing device calls the called terminal, and thus communication between the relay processing device and the called terminal is established. The relay processing device relays the phone call between the calling terminal and the called terminal (for example, see Patent Document 1).

When relaying the calling terminal and the called terminal by using the relay processing device, there is a disadvantage that the phone number of the calling terminal is not transmitted to the called terminal, and thus it cannot be aware of which calling terminal has called. To solve this problem, Patent Document 2 discloses a system that performs the following process to confirm from which calling terminal the called terminal is receiving a call. Firstly, plural phone numbers are prepared, which are used when the relay processing device establishes communication with the called terminal. Then, a user of the called terminal allocates the phone numbers of terminals that may be the calling terminals to the respective phone numbers. The relay processing device determines which phone number is used to call the called terminal according to the allocation.

RELATED DOCUMENT

Patent Document

[Patent Document 1] PCT Japanese Translation Patent Publication No. 2006-003758
[Patent Document 2] Pamphlet of International Publication No. WO 2008/078458

DISCLOSURE OF THE INVENTION

In the method described in Patent Document 2, it is required for a user to make a phone number, which is used when the relay processing device calls the calling terminal, correspond to a phone number of a terminal that may be the calling terminal by using the called terminal or the like. It is required that the relay processing device stores data that indicates this correspondence. On the other hand, in consideration of the updating of the correspondence of the phone numbers, it is preferable that the called terminal also stores the data that indicates this correspondence. That is, in the method described in Patent Document 2, both the relay processing device and the called terminal store the data that indicates the correspondence. Due to this, double management of the data that indicates the correspondence is required, thus, it is required to expend effort in the maintenance of the data.

The present invention has been made in consideration of the above-described problems, and an object of the present invention is to provide a relay processing device, a communication terminal, a relay processing system, a relay processing method, and a program, which can transmit information for specifying a call terminal to a called terminal without the necessity of expending effort in the maintenance of data.

According to the present invention, there is provided a relay processing device that relays a phone call from a call terminal to a called terminal, in which the calling terminal uses a first phone number of the relay processing device as a phone number of the called terminal, and the called terminal is capable of performing both voice communication and data communication, the relay processing device comprising: a phone number storage unit storing the first phone number and called terminal specific information that specifies the called terminal so as to correspond to each other; a relay processing unit receiving first call information including the first phone number and a phone number of the calling terminal from the calling terminal; a called information transmission unit reading the called terminal specific information from the phone number storage unit by using the first phone number included in the first call information, and performing data communication of called information, which includes calling terminal specific information that is specified by the phone number of the calling terminal as information that specifies the calling terminal, with the called terminal by using the called terminal specific information; and a connection information reception unit receiving connection information, which indicates whether or not to connect the phone call between the called terminal and the calling terminal, from the called terminal after the called information transmission unit transmits the called information to the called terminal, wherein the relay processing unit connects the phone call between the called terminal and the calling terminal or cuts off the connection with the calling terminal according to the connection information.

According to the present invention, there is provided a communication terminal making a phone call with a call terminal through a relay processing device and capable of performing both voice communication and data communication, in which the calling terminal uses a first phone number of the relay processing device as a phone number of the communication terminal, the communication terminal comprising: a called information reception unit receiving called information that includes calling terminal specific information specifying the calling terminal from the relay processing device through data communication; a notification unit notifying a user of the calling terminal specific information; a response information acquisition unit acquiring response information indicating whether or not to accept the call from the calling terminal, from the user; and a connection information transmission unit transmitting connection information, which indicates whether or not to connect the phone call with the calling terminal, to the relay processing device based on the response information.

According to the present invention, there is provided a relay processing system comprising a called terminal; and a relay processing device relaying a phone call from a call terminal to the called terminal, wherein the calling terminal uses a first phone number of the relay processing device as a phone number of the called terminal, and the called terminal is capable of performing both voice communication and data communication, wherein the relay processing device includes; a phone number storage unit storing the first phone number and called terminal specific information that specifies the called terminal so as to correspond to each other; a relay processing unit receiving first call information including the first phone number and a phone number of the calling terminal from the calling terminal; and a called information transmission unit reading the called terminal specific information from the phone number storage unit by using the first phone number included in the first call information, and performing data communication of called information, which includes calling terminal specific information that is specified by the phone number of the calling terminal as information that specifies the calling terminal, with the called terminal by using the calling terminal specific information, wherein the called terminal includes a called information reception unit receiving the called information from the relay processing device through data communication; a notification unit notifying a user of the calling terminal specific information included in the called information; a response information acquisition unit acquiring response information indicating whether or not to accept a call from the calling terminal, from the user; and a connection information transmission unit transmitting connection information, which indicates whether or not to connect the phone call with the calling terminal, to the relay processing device based on the response information, wherein the relay processing device further includes a connection information reception unit receiving the connection information, and the relay processing unit of the relay processing device connects the phone call between the called terminal and the calling terminal or cuts off the connection with the calling terminal according to the connection information.

According to the present invention, there is provided a relay processing method for relaying a phone call from a call terminal to a called terminal, in which the calling terminal uses a first phone number of the relay processing device as a phone number of the called terminal, the called terminal is capable of performing both voice communication and data communication, and the first phone number and called terminal specific information that specifies the called terminal are stored in phone number storage unit so as to correspond to each other, the relay processing method comprising:

receiving, by a computer, first call information including the first phone number and a phone number of the calling terminal from the calling terminal; reading, by the computer, the called terminal specific information from the phone number storage unit by using the first phone number included in the first call information, and performing data communication of called information, which includes calling terminal specific information that is specified by the phone number of the calling terminal as information that specifies the calling terminal, with the called terminal by using the r called terminal specific information; and receiving connection information, which indicates whether or not to connect the phone call between the called terminal and the calling terminal, from the called terminal after the called information is transmitted to the called terminal, and connecting the phone call between the called terminal and the calling terminal or cutting off the connection with the calling terminal according to the connection information.

According to the present invention, there is provided a calling method in which a communication terminal makes a phone call with a call terminal through a relay processing device, and is capable of performing both voice communication and data communication, and the calling terminal uses a first phone number of the relay processing device as a phone number of the communication terminal, the calling method comprising: receiving, by the communication terminal, called information that includes calling terminal specific information that specifies the calling terminal from the relay processing device through data communication; notifying, by the communication terminal, a user of the calling terminal specific information included in the called information; acquiring, by the communication terminal, response information indicating whether or not to accept a call from the calling terminal, from the user; and transmitting, by the communication terminal, connection information, which indicates whether or not to connect the phone call with the calling terminal, to the relay processing device based on the response information.

According to the present invention, there is provided a program for making a computer function as a relay processing device that relays a phone call from a call terminal to a called terminal, in which the calling terminal uses a first phone number of the relay processing device as a phone number of the called terminal, and the called terminal is capable of performing both voice communication and data communication, the program realizes the computer the functions of:

connecting to a phone number storage unit by making the first phone number and called terminal specific information that specifies the called terminal correspond to each other; receiving first call information including the first phone number from the calling terminal; reading the called terminal specific information from the phone number storage unit by using the first phone number included in the first call information, and performing data communication of called information, which includes calling terminal specific information that is specified by a phone number of the calling terminal as information that specifies the calling terminal, with the called terminal by using the calling terminal specific information; receiving connection information, which indicates whether or not to connect the phone call between the called terminal and the calling terminal, from the called terminal after transmitting the called information to the called terminal; and connecting the phone call between the called terminal and the calling terminal or cutting off the connection with the calling terminal according to the connection information.

According to the present invention, a program for use in a communication terminal that calls a call terminal through a relay processing device, in which the communication terminal can perform both voice communication and data communication, and the calling terminal uses a first phone number of the relay processing device as a phone number of the communication terminal, the program realizes the communication terminal the functions of: receiving called information that includes calling terminal specific information that specifies the calling terminal from the relay processing device through data communication; notifying a user of the calling terminal specific information included in the called information; acquiring response information indicating whether or not to accept a call from the calling terminal, from the user; and transmitting connection information, which indicates whether or not to connect the phone call with the calling terminal, to the relay processing device based on the response information.

According to the present invention, information for specifying the calling terminal can be transmitted to the called terminal without the necessity of expending effort in the maintenance of data.

BRIEF DESCRIPTION OF THE DRAWINGS

FIG. 3 is a diagram illustrating information stored in a phone number storage unit of a relay processing device in a table form.

FIG. 7 is a diagram illustrating a first example of the display that is performed by a display unit of a called terminal in step S100 of FIGS. 5 and 6.

FIG. 8 is a diagram illustrating a second example of the display that is performed by a display unit of a called terminal in step S100 of FIGS. 5 and 6.

FIG. 10 is a diagram illustrating information stored in a user information storage unit in a table form.

FIG. 12 is a diagram illustrating a display example of a display unit in step S100.

BEST MODE FOR CARRYING OUT THE INVENTION

Figure 1:
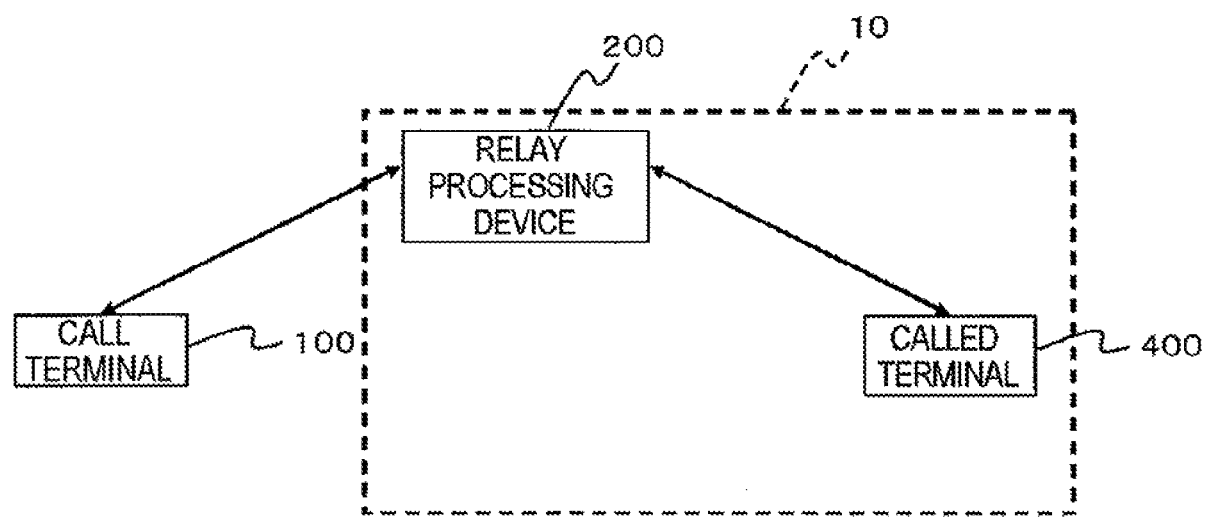
FIG. 1 is a block diagram illustrating the configuration of a relay processing system according to a first embodiment of the invention.

Hereinafter, exemplary embodiments of the invention will be described with reference to the accompanying drawings. In all drawings, the same reference numerals are given to the same components, and the detailed description thereof will not be repeated.

(First Embodiment)

FIG. 1 is a block diagram illustrating the configuration of a relay processing system 10 according to a first embodiment of the invention. The relay processing system 10 includes a called terminal 400 and a relay processing device 200. The relay processing device 200 relays a phone call from a call terminal 100 to the called terminal 400. The calling terminal 100 uses a first phone number of the relay processing device 200 as the a phone number of the called terminal 400. Further, the called terminal 400 is capable of performing both voice communication and data communication. The called terminal 400, for example, is a portable phone.

When the relay processing device 200 receives a call from the calling terminal 100 to the called terminal 400, it transmits calling terminal specific information that specifies the calling terminal 100 to the called terminal 400 by using data communication. The calling terminal specific information, for example, is the phone number of the calling terminal 100, but may be a user's name of the calling terminal 100. The called terminal 400 transmits to the relay processing device 200, connection information that indicates whether or not to respond to the call from the calling terminal 100. The transmission of the connection information may be performed by any one of voice communication and data communication. The relay processing device 200 connects the phone call between the called terminal 400 and the calling terminal 100 or cuts off the connection between the calling terminal 100 and the relay processing device 200 according to the connection information. Hereinafter, this will be described in detail.

Figure 2:
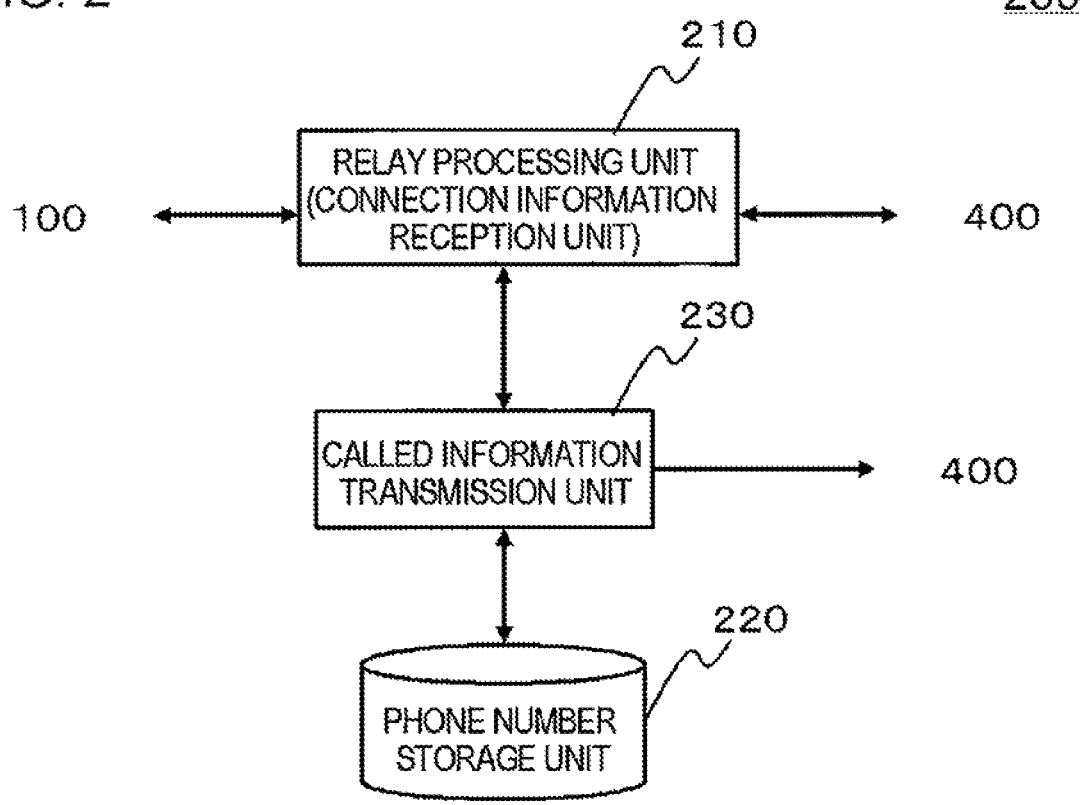
FIG. 2 is a block diagram illustrating the functional configuration of a relay processing device.

FIG. 2 is a block diagram illustrating the functional configuration of a relay processing device 200. The relay processing device 200 includes a relay processing unit 210, a phone number storage unit 220, and a called information transmission unit 230.

The relay processing unit 210 receives first call information from the calling terminal 100. The first call information includes a first phone number and the phone number of the calling terminal 100. Further, the relay processing unit 210 functions as a connection information reception unit. That is, the relay processing unit 210 receives connection information after the called information transmission unit 230 transmits called information to the called terminal 400. Then, the relay processing unit 210 connects the phone call between the called terminal 400 and the calling terminal 100 or cuts off the connection between the calling terminal 100 and the relay processing device 200 according to the connection information.

The phone number storage unit 220 stores the first phone number and called terminal specific information that specifies the called terminal 400 so as to correspond to each other. The called terminal specific information, for example, may be the phone number of the called terminal 400 or an e-mail address.

The called information transmission unit 230 reads the called terminal specific information from the phone number storage unit 220 by using the first phone number included in the first call information. Further, the called information transmission unit 230 performs data communication of the called information with the called terminal 400 by using the called terminal specific information. The called information includes calling terminal specific information that specifies the calling terminal 100, for example, the phone number of the calling terminal 100.

In FIG. 1, the configuration of units that are relevant to the essence of the present invention will not be illustrated in the drawing. Each component of the relay processing device 200 illustrated in FIG. 1 does not indicate the configuration of a hardware unit, but indicates a block of a functional unit. Each component of the relay processing device 200 is realized by any combination of hardware and software based on a CPU of any computer, a memory, a program loaded in the memory for realizing the components in the drawing, a storage unit such as a hard disk that stores the program, and an interface for network connection. It will be understood by those skilled in the art that there are various modifications of the realization method and device.

FIG. 3 is a diagram illustrating information stored in a phone number storage unit 220 of a relay processing device 200 in a table form. In an example illustrated in the drawing, the relay processing device 200 performs the above-described process with respect to a plurality of called terminals 400. The phone number storage unit 220 stores first phone numbers which are different from one another, the phone numbers of the called terminals 400, and e-mail addresses of the called terminals 400 for each of the called terminals 400 so as to correspond to one another.

Figure 4:
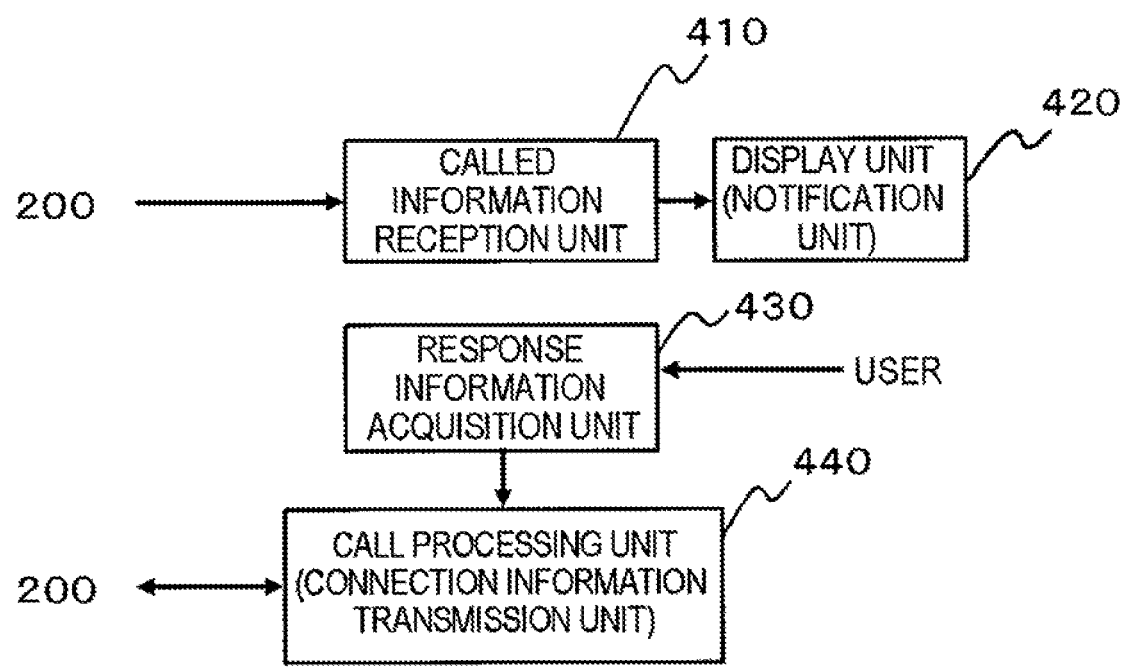
FIG. 4 is a block diagram illustrating the functional configuration of a called terminal.

FIG. 4 is a block diagram illustrating the functional configuration of the called terminal 400. The called terminal 400 includes a called information reception unit 410, a display unit (notification unit) 420, a response information acquisition unit 430, and a call processing unit 440. The called information reception unit 410 receives the called information from the relay processing device 200 through data communication. The display unit 420 displays the calling terminal specific information to notify a user of the calling terminal specific information. The response information acquisition unit 430 acquires from the user, response information that indicates whether or not to accept the call from the calling terminal 100. This acquisition, for example, is performed through an input key (not illustrated) set in the called terminal processing unit (connection information transmission unit) 440 performs a call process. Further, the call processing unit 440 transmits to the relay processing device 200, the connection information that indicates whether or not to connect the call with the calling terminal 100 based on the response information.

In FIG. 4, the configuration of units that are relevant to the essence of the present invention will not be illustrated in the drawing. For example, a radio communication function unit, a speaker, a microphone, and the like, which are configurations of a typical telephone, are not illustrated. Each component of the called terminal 400 illustrated in FIG. 4 does not indicate the configuration of a hardware unit, but indicates a block of a functional unit. Each component of the called terminal 400 is realized by any combination of hardware and software based on a CPU of any computer, a memory, a program loaded in the memory for realizing the components in the drawing, a storage unit such as a hard disk that stores the program, and an interface for network connection. It will be understood by those skilled in the art that there are various modifications of the realization method and device.

Figure 5:
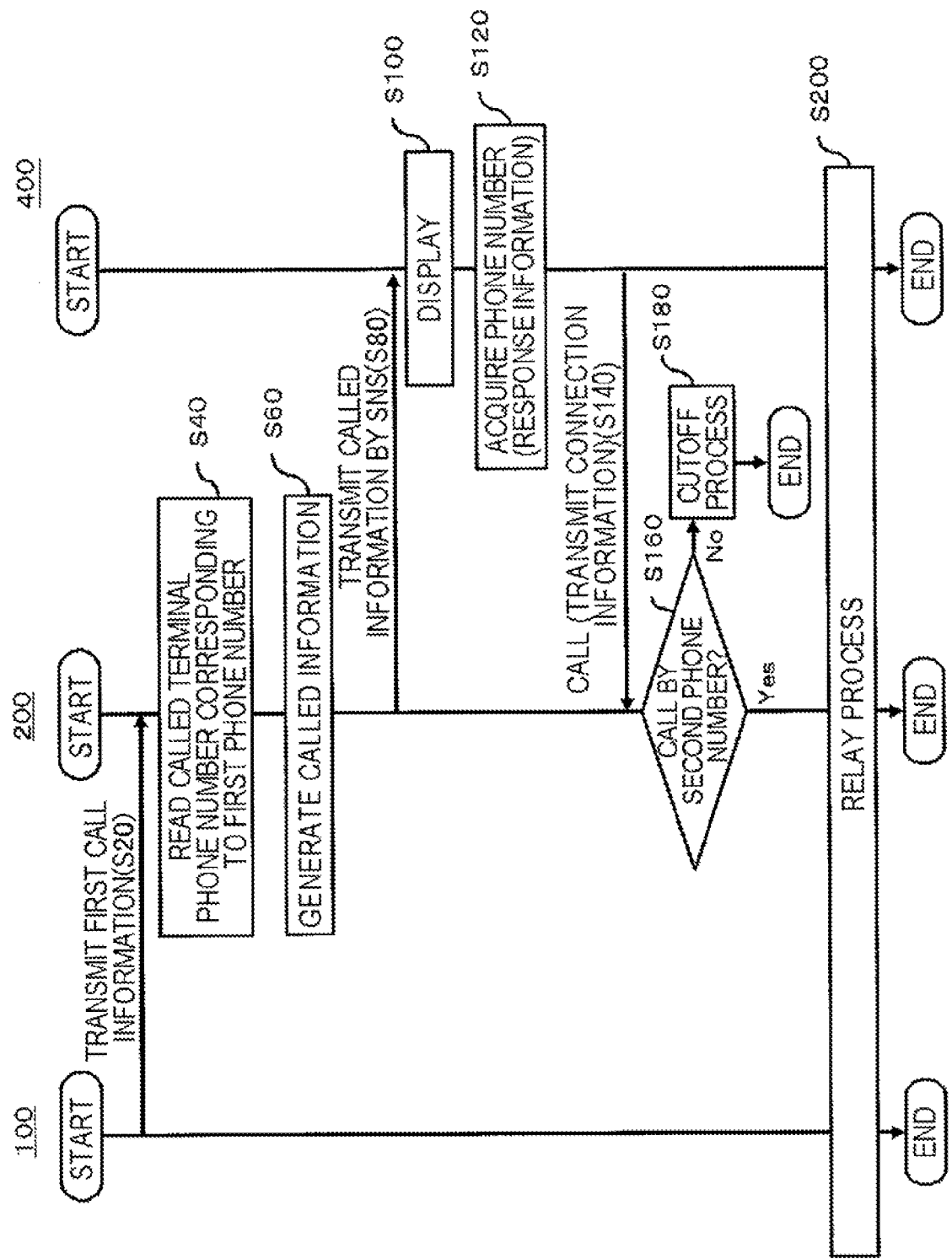
FIG. 5 is a flowchart illustrating a first example of the operation of a relay processing system illustrated in FIG. 1.

FIG. 5 is a flowchart illustrating a first example of the operation of the relay processing system illustrated in FIG. 1. In the process illustrated in the drawing, the relay processing device 200 has a second phone number and a third phone number as phone numbers when receiving the call from the called terminal 400.

Further, the relay processing unit 210 of the relay processing device 200 receives second call information of the relay processing device 200 from the called terminal 400 as the connection information. The relay processing unit 210 connects the phone call between the called terminal 400 and the calling terminal 100 when the second call information is transmitted by using the second phone number, and cuts off the connection with the calling terminal 100 when the second call information is transmitted by using the third phone number. The second phone number and the third phone number may be included in the called information or may be stored in the called terminal 400 in advance. Hereinafter, this will be described in detail.

Firstly, a user of the calling terminal 100 inputs or selects the first phone number by intending the call from the calling terminal 100 to the called terminal 400. The calling terminal 100 performs a call process by using the first phone number of the relay processing device 200 and transmits the first call information to the relay processing device 200 (step S20).

When the first call information is received, the relay processing unit 210 of the relay processing device 200 sends the first phone number included in the first call information and the phone number of the calling terminal 100 to the called information transmission unit 230. The called information transmission unit 230 reads the called terminal phone number that corresponds to the first phone number from the phone number storage unit 220 (step S40). Then, the called information transmission unit 230 generates the called information (step S60), and transmits the called information to the called terminal 400 through a short message service (SNS) (step S80). The called information includes the phone number of the calling terminal 100. Here, if the phone number of the calling terminal 100 cannot be acquired, for example, if the calling terminal 100 is set to block a calling number, or is a public telephone, the called information includes a message such as "the calling number is blocked" or "unable to get the calling number" instead of the phone number of the calling terminal 100. In this embodiment of the invention, the called information includes the second phone number and the third phone number of the relay processing device 200.

When the called information is received, the called information reception unit 410 of the called terminal 400 reads the phone number of the calling terminal 100 included in the called information, and generates display data for performing display on a display unit 420 by using the phone number. Further, the called information reception unit 410 outputs the generated display data to the display unit 420 to make the display unit 420 perform the display (step S100). In this case, the called information reception unit 410 may inform the user of the call from the calling terminal 100 by using ringtones or the like.

The user confirms the display on the display unit 420, determines whether or not to respond to the call from the calling terminal 100, and inputs the phone number as response information. That is, the user inputs the second phone number when responding to the call and inputs the third phone number when rejecting the call. The response information acquisition unit 430 acquires the input phone number (step S120), and calls the relay processing device 200 by using the acquired phone number (step S140). In this case, the call information to be transmitted includes the called terminal phone number of the called terminal 400 in addition to the phone number of the relay processing device 200.

When the call information is received, the relay processing unit 210 of the relay processing device 200 determines which phone number is used to perform the call from the called terminal 400. When the calling is performed with the second phone number ("Yes" in step S160), the relay processing device 210 establishes communication with the called terminal 400 and the calling terminal 100, and performs the relay of the phone call between the calling terminal 100 and the called terminal 400 (step S200). When the call is performed with the third phone number ("No" in step S160), the relay processing device 210 cuts off the communication with the called terminal 400 and the calling terminal 100, and performs the process for a call rejection (step S180). In this case, the relay processing device 210 may transmit predetermined voice data to the calling terminal 100.

Figure 6:
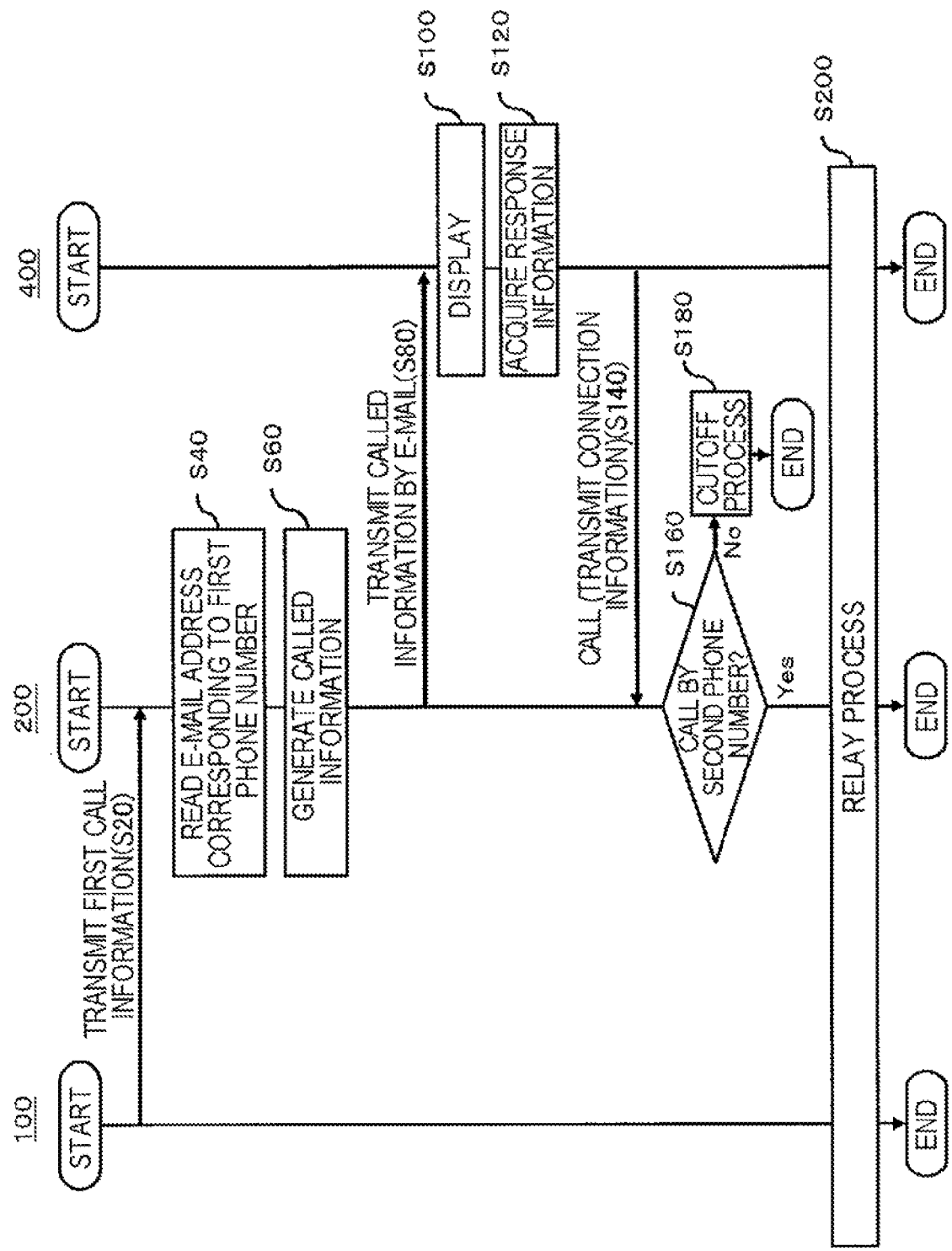
FIG. 6 is a flowchart illustrating a second example of the operation of a relay processing system illustrated in FIG. 1.

FIG. 6 is a flowchart illustrating a second example of the operation of the relay processing system illustrated in FIG. 1. The processing illustrated in the drawing is equal to that of the first example illustrated in FIG. 5 except for the point that the called information transmission unit 230 of the relay processing device 200 transmits the called information by using an e-mail.

That is, the called information transmission unit 230 reads an e-mail address that corresponds to the first phone number from the phone number storage unit 220 in step S40, and transmits the called information to the called terminal 400 by e-mail in step S80.

FIG. 7 is a diagram illustrating a first example of the display that is performed by the display unit 420 of the called terminal 400 in step S100 of FIGS. 5 and 6. In the example illustrated in the drawing, the display unit 420 displays the second phone number and the third phone number to select either one of them. The user can input the second phone number or the third phone number by selecting the second phone number or the third phone number.

FIG. 8 is a diagram illustrating a second example of the display that is performed by the display unit 420 of the called terminal 400 in step S100 of FIGS. 5 and 6. In the example illustrated in the drawing, the called terminal 400 can process HTML type data. The display unit 420 displays a response button selected when responding to the call from the calling terminal 100, and a rejection button selected when rejecting the call. The response information acquisition unit 430 of the called terminal 400 acquires the selection of the response button or the rejection button as the response information. Further, the call processing unit 440 calls the relay processing device 200 by using the second phone number when the user selects the response button, and calls the relay processing device 200 by using the third phone number when the user selects the rejection button.

Next, the operation and effect according to this embodiment of the invention will be described. In this embodiment, when the calling is made from the calling terminal 100 to the relay processing device 200, the relay processing device 200 transmits the called information to the called terminal 400 by using the data communication. The called information includes calling terminal specific information that specifies the calling terminal 100. Because of this, information for specifying the calling terminal 100 can be transmitted to the called terminal 400. Further, since any special data is not required, it is not necessary to expend effort in the maintenance of the data.

Also, since the second phone number and the third phone number are used as the response information, the called terminal 400 can transmit the response information through voice communication. Further, in the case of responding or rejecting, the process in the relay processing device 200 is simplified.

(Second Embodiment)

Figure 9:
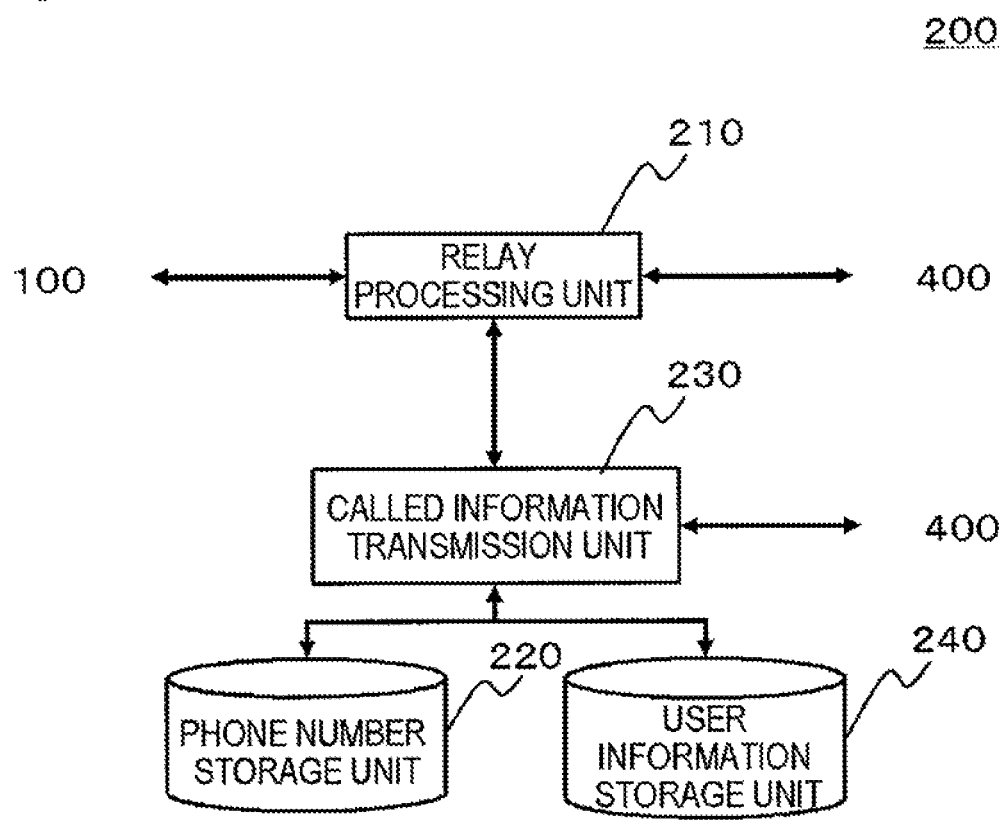
FIG. 9 is a block diagram illustrating the functional configuration of a relay processing device of a relay processing system according to a second embodiment of the invention.

FIG. 9 is a block diagram illustrating the functional configuration of the relay processing device 200 of the relay processing system 10 according to a second embodiment of the invention, and corresponds to FIG. 2 according to the first embodiment of the invention. This relay processing system is equal to the relay processing system according to the first embodiment of the invention except the point that the relay processing device 200 includes a user information storage unit 240.

The user information storage unit 240 stores the user information of the calling terminal 100 to correspond to the phone number of the calling terminal 100. The called information transmission unit 230 of the relay processing device 200 reads from the user information storage unit 240, the user information that corresponds to the phone number of the calling terminal 100 received by the relay processing unit 210 and includes the user information in the called information for transmission of the called information.

FIG. 10 is a diagram illustrating information stored in the user information storage unit 240 in a table form.

The user information storage unit 240 stores a user name and its attribute to correspond to the phone number of the calling terminal 100 as the user information. The attribute of the user, for example, is a company name to which the user belongs, and may further include a department name.

Figure 11:
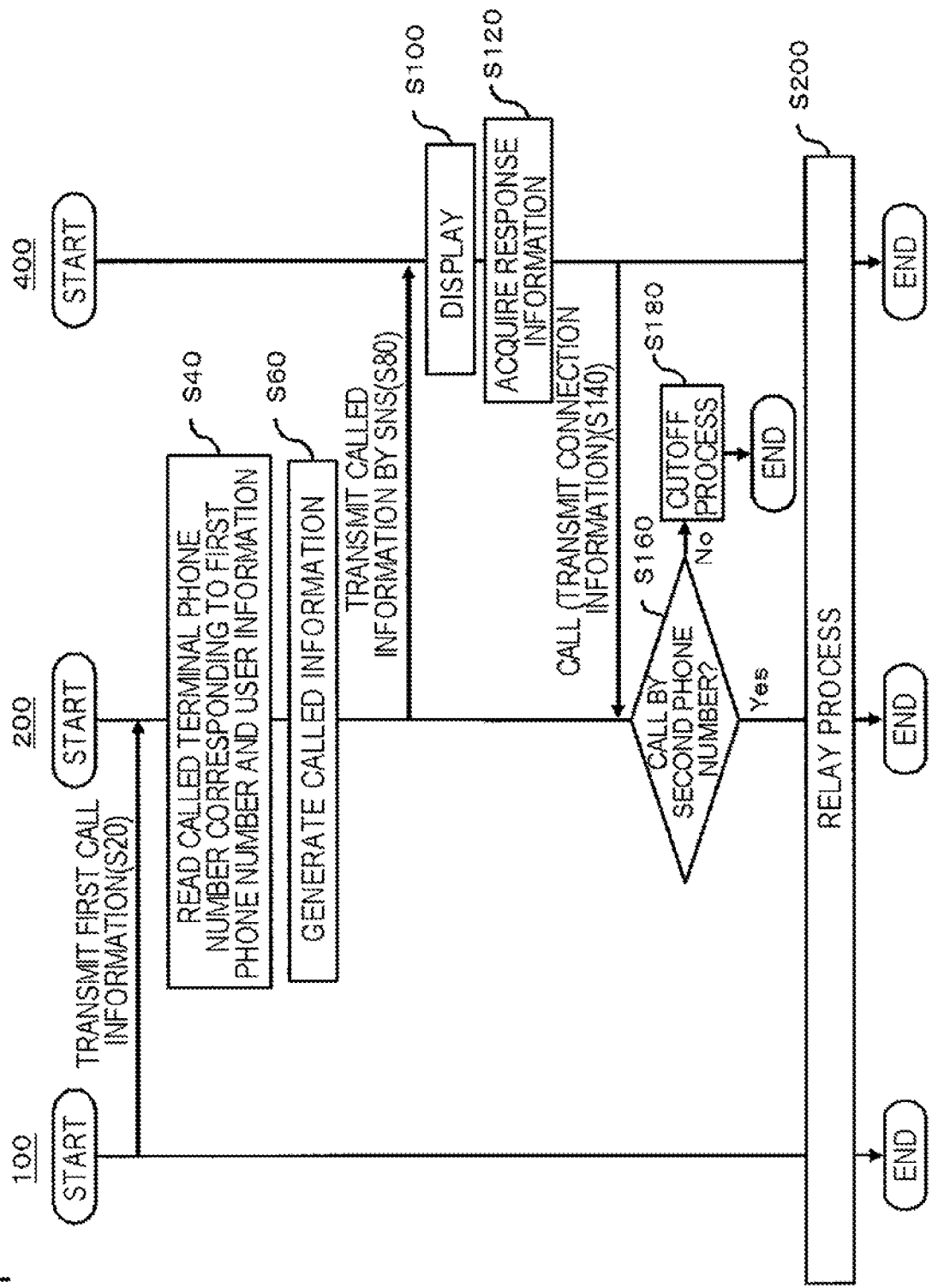
FIG. 11 is a flowchart illustrating an example of the operation of a relay processing system according to an embodiment of the invention.

FIG. 11 is a flowchart illustrating an example of the operation of a relay processing system according to an embodiment of the invention, and corresponds to FIG. 5 according to the first embodiment of the invention. The operation, illustrated in the drawing is equal to the operation described in FIG. 5 according to the first embodiment of the invention except for the following points.

Firstly, in step S40, the called information transmission unit 230 reads the called terminal phone number that corresponds to the first phone number from the phone number storage unit 220 as well as the user information that corresponds to the phone number of the calling terminal 100 from the user information storage unit 240. Further, in step S60, the called information transmission unit 230 includes the user information of step S40 in the called information.

Further, in step S100, the display unit 420 of the called terminal 400 displays the user information included in the called information.

FIG. 12 is a diagram illustrating a display example of the display unit 420 in step S100. In an example illustrated in this drawing, the display unit 420 displays the user information of the calling terminal 100 together with the phone number of the calling terminal 100.

In this embodiment of the invention, in the same manner as in FIG. 6 according to the first embodiment of the invention, the called information may be transmitted by e-mail rather than by SNS.

Even by this embodiment of the invention, the same effect as that of the first embodiment can be obtained. Further, since the called information includes the user terminal of the calling terminal 100, the display unit 420 of the called terminal 400 can display the user information of the calling terminal 100 even if the called terminal 400 does not store phone book data.

(Third Embodiment)

The relay processing system 10 according to a third embodiment of the invention is equal to that of the first embodiment except for the point that the transmission of the connection information from the called terminal 400 to the relay processing device 200 is performed through the data communication.

Figure 13:
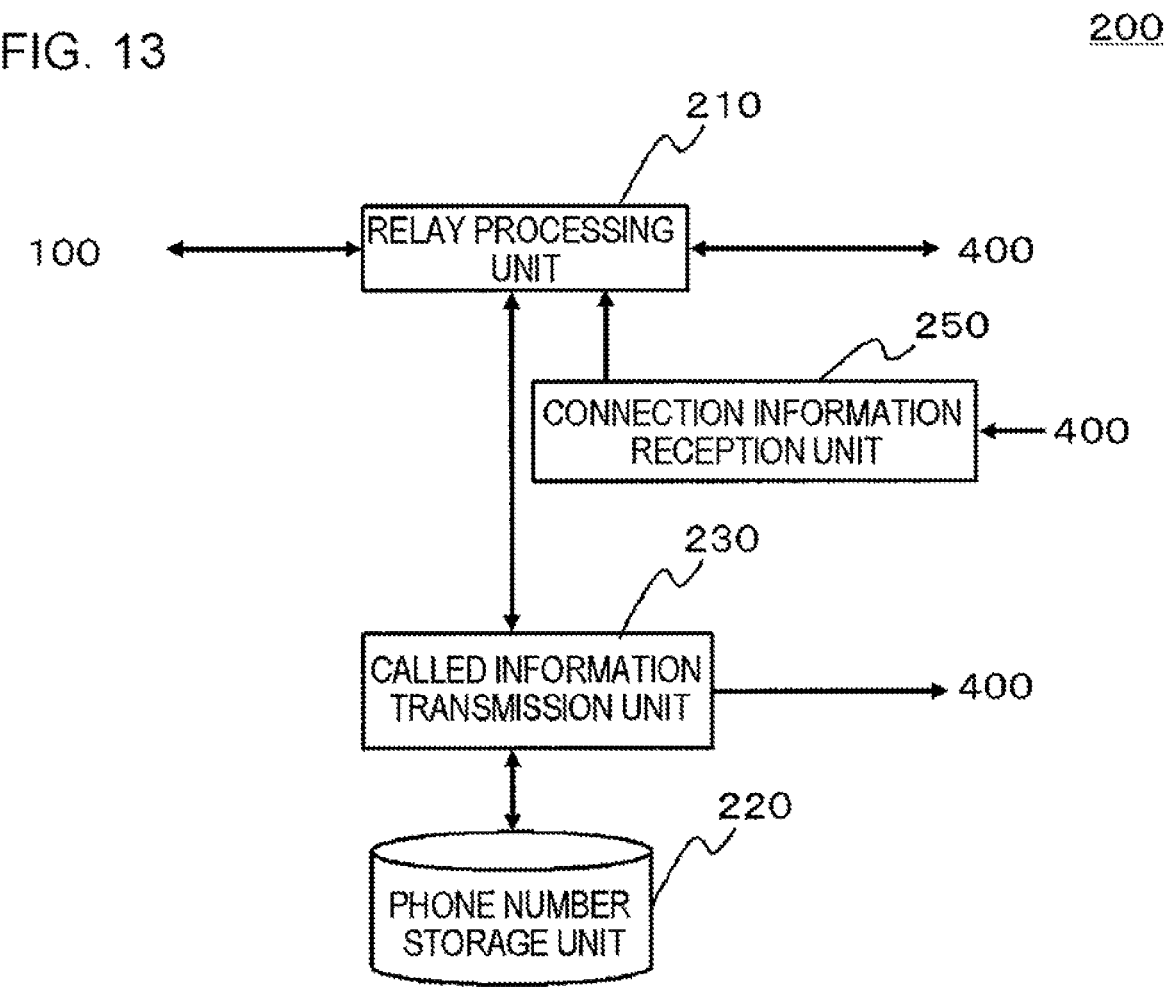
FIG. 13 is a block diagram illustrating the functional configuration of a relay processing device of a relay processing system according to an embodiment of the invention.

FIG. 13 is a block diagram illustrating the functional configuration of the relay processing device 200 of the relay processing system 10 according to this embodiment of the invention. The relay processing device 200 illustrated in the drawing has the same configuration as that of the relay processing device 200 according to the first or second embodiment of the invention except for the point that the relay processing device 200 includes a connection information reception unit 250 separately from the relay processing unit 210.

The connection information reception unit 250 receives the connection information transmitted from the called terminal 400 through the data communication. Further, the connection information reception unit 250 analyzes the received connection information and instructs the relay processing unit 210 whether or not to perform a responding process or a cutoff process.

Figure 14:
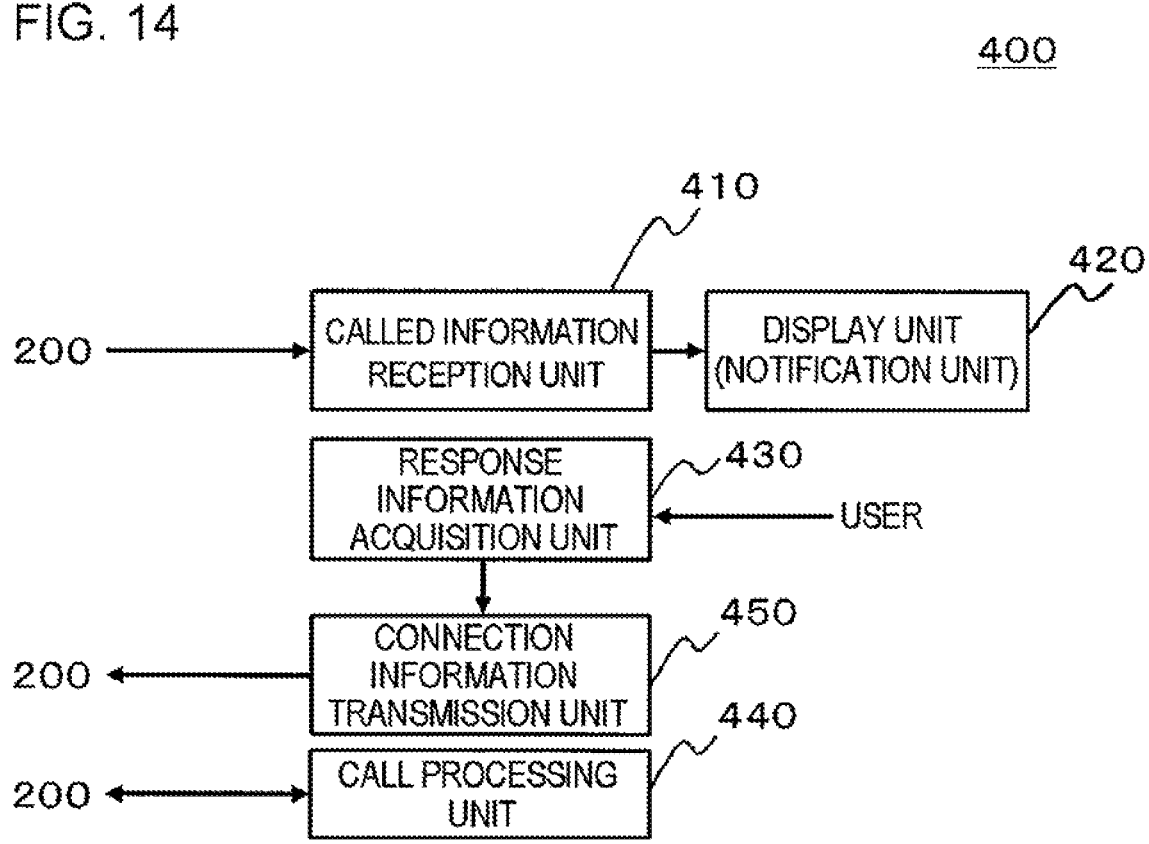
FIG. 14 is a block diagram illustrating the functional configuration of a called terminal of a relay processing system according to an embodiment of the invention.

FIG. 14 is a block diagram illustrating the functional configuration of the called terminal 400 of the relay processing system 10 according to an embodiment of the invention. The called terminal 400 illustrated in the drawing has the same configuration as that of the relay processing device 200 according to the first or second embodiment of the invention except for the point that the called terminal 400 includes a connection information transmission unit 450 separately from the call processing unit 440. The connection information transmission unit 450 transmits the connection information through the data communication.

Figure 15:
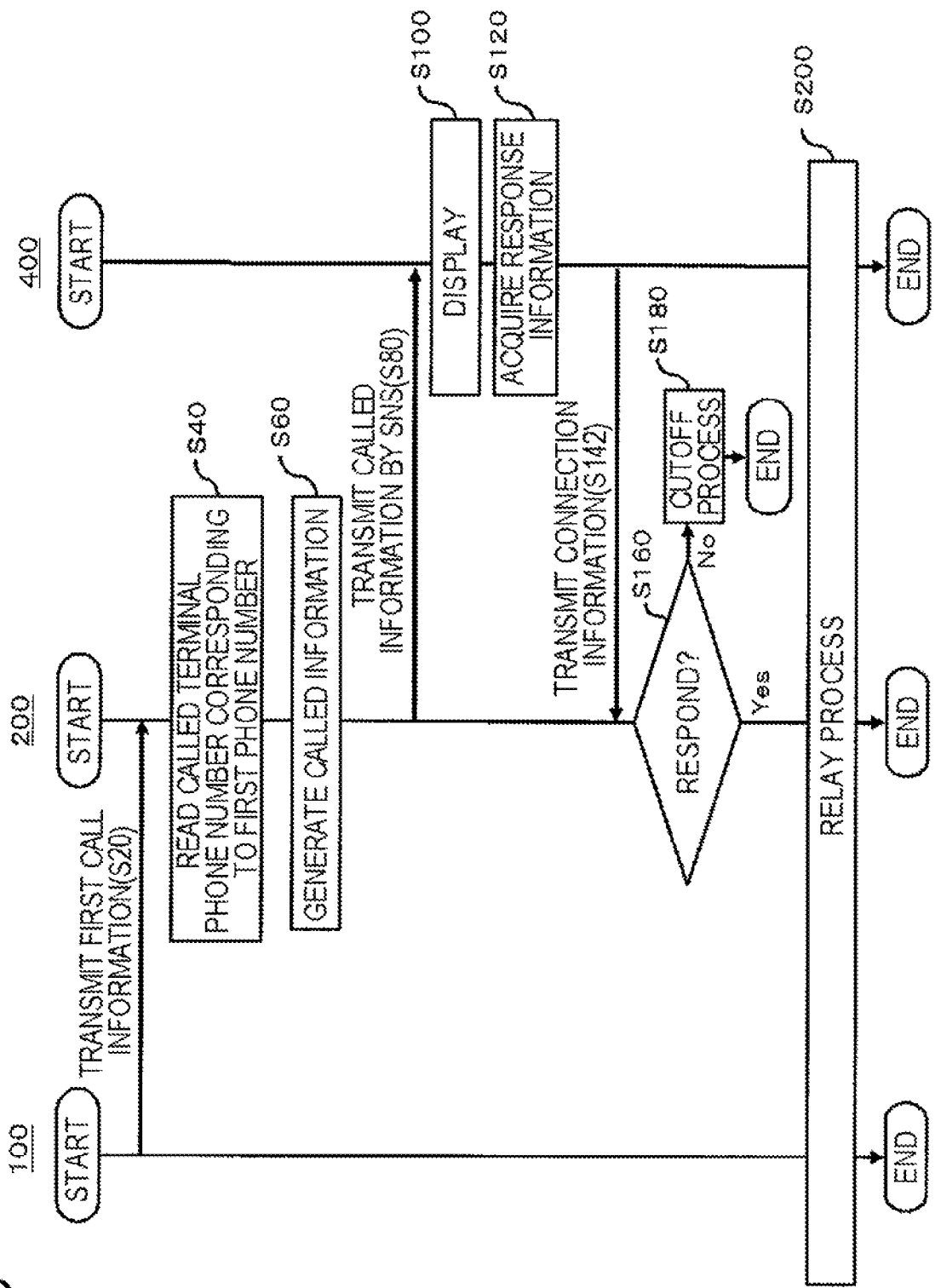
FIG. 15 is a flowchart illustrating the operation of a relay processing system according to an embodiment of the invention.

FIG. 15 is a flowchart illustrating the operation of the relay processing system 10 according to an embodiment of the invention, and corresponds to FIG. 5 according to the first embodiment of the invention. The operation illustrated in the drawing is equal to the operation described in FIG. 5 except for the followings.

First, the response information acquisition unit 430 of the called terminal 400 acquires information that indicates whether or not to respond to the call from the calling terminal 100, rather than the second phone number or the third phone number, from the user as the response information (S120), and sends the information to the connection information transmission unit 450. The connection information transmission unit 450 generates the connection information for data communication based on the acquired information, and transmits the generated connection information through the data communication (step S142).

The connection information reception unit 250 receives the connection information that is transmitted from the called terminal 400 through the data communication. Then, the connection information reception unit 250 analyzes the connection information and instructs the relay processing unit 210 whether or not to perform the responding process or cutoff process. The relay processing unit 210 determines whether or not to perform the relay process (step S200) or the cutoff process (step S180) according to the instruction from the connection information reception unit 250 (step S160). When performing the relay process, the relay unit 210 calls the called terminal 400 (step S200). Also, when performing the cutoff process, the relay unit 210 cuts off the communication with the calling terminal 100 (step S180).

In this embodiment of the invention, in the same manner as in FIG. 6 according to the first embodiment of the invention, the called information may be transmitted by e-mail rather than by SNS. Further, in the same manner as the second embodiment of the invention, the relay processing device 200 may include the user information storage unit 240.

Even by this embodiment of the invention, the same effect as that of the first embodiment of the invention can be obtained. Further, the called terminal 400 may transmit the connection information through the data communication.

(Fourth Embodiment)

Figure 16:
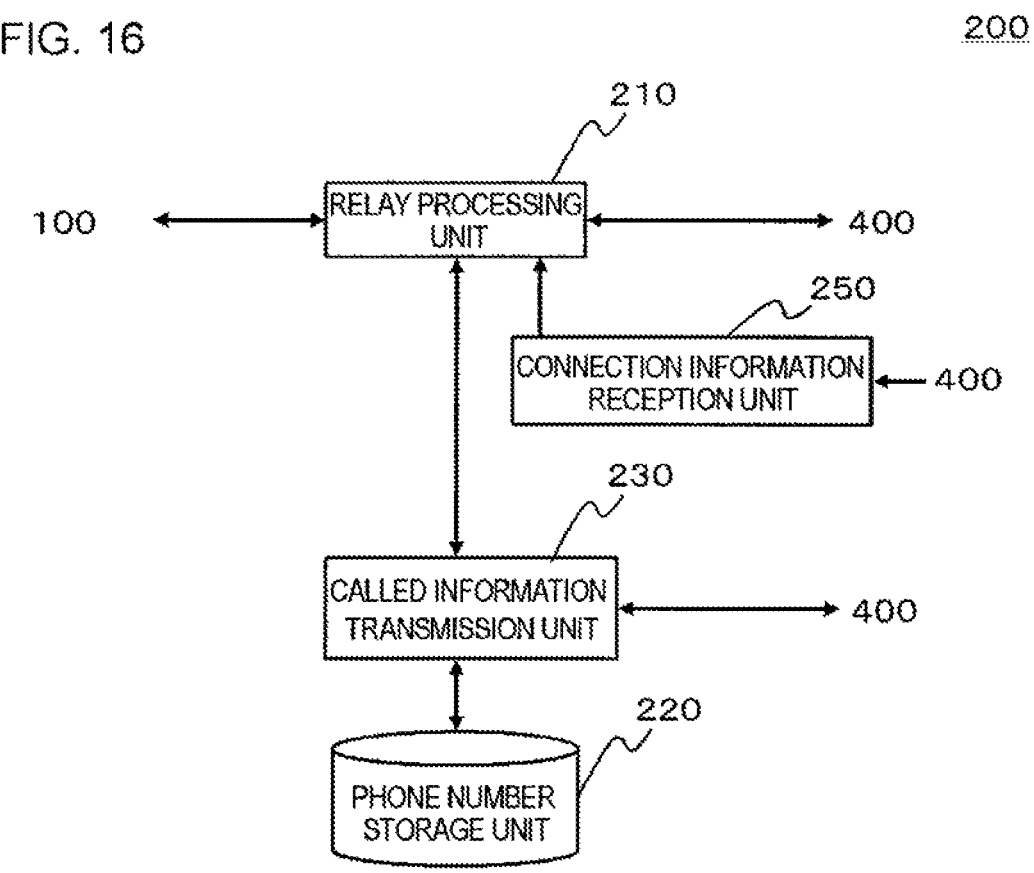
FIG. 16 is a block diagram illustrating the functional configuration of a relay processing device of a relay processing system according to a fourth embodiment of the invention.

FIG. 16 is a block diagram illustrating the functional configuration of the relay processing device 200 of the relay processing system 10 according to a fourth embodiment of the invention. The relay processing device 200 according to this embodiment is equal to that of the third embodiment of the invention except for the following points. Firstly, before the called information transmission unit 230 transmits the called information, the relay processing unit 210 of the relay processing device 200 calls the called terminal 400 to establish the phone call between the calling terminal 100 and the called terminal 400. Further, the called information transmission unit 230 performs the data communication of the called information with the called terminal 400 when receiving request information indicating that the called information is requested from the called terminal 400.

Figure 17:
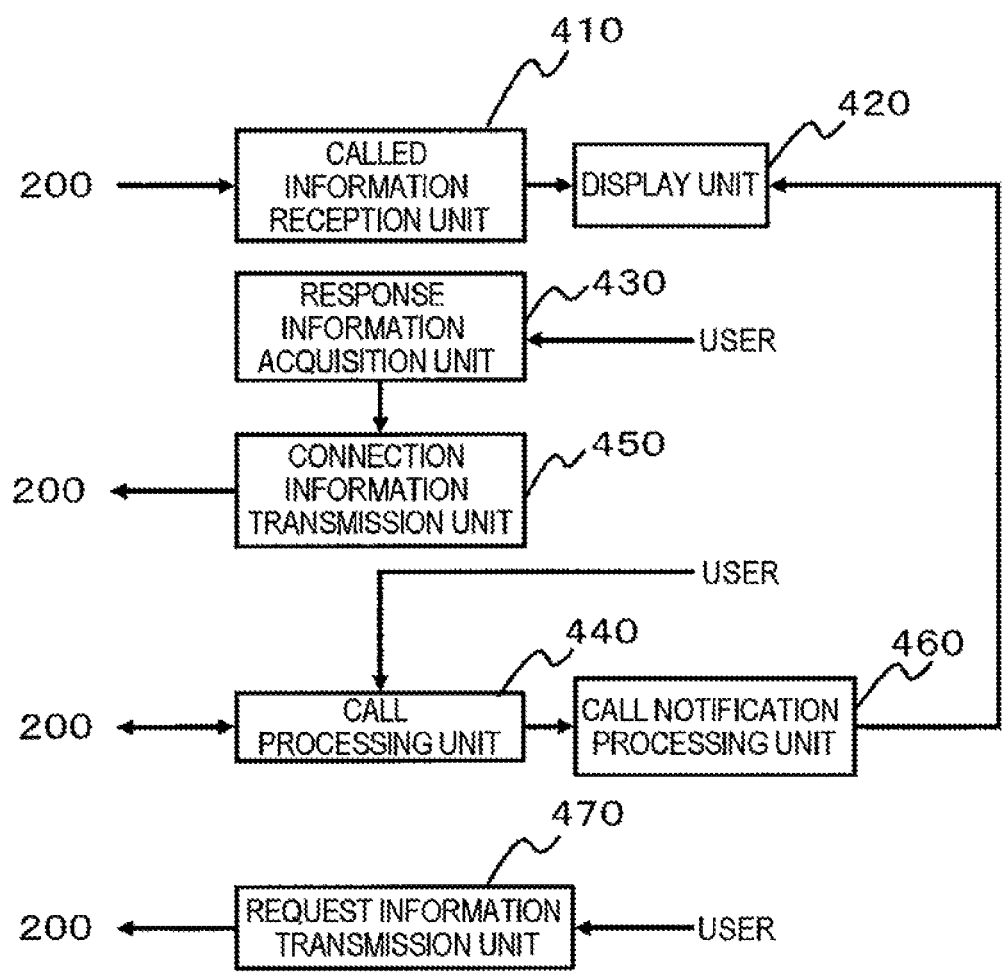
FIG. 17 is a block diagram illustrating the functional configuration of a called terminal according to an embodiment of the invention.

FIG. 17 is a block diagram illustrating the functional configuration of the called terminal 400 according to this embodiment of the invention. The called terminal 400 is equal to the called terminal 400 according to the third embodiment of the invention except for the following points.

Firstly, before the called information reception unit 410 receives the called information, the call processing unit 440 receives the call information for establishing the phone call with the calling terminal 100 from the relay processing device 200.

Further, the called terminal 400 includes a call notification processing unit 460 and a request information transmission unit 470. The call notification processing unit 460 performs the call notification process notifying a user that the call processing unit 440 has received the call information. The call notification process, for example, includes performance of a predetermined display on the display unit 420. The request information transmission unit 470 acquires information indicating that the called information is requested from the user. Further, the request information transmission unit 470 transmits the request information for requesting the called information to the relay processing device 200.

Further, the called information reception unit 410' acquires the called information after the call notification processing unit 460 performs the call notification process.

Figure 18:
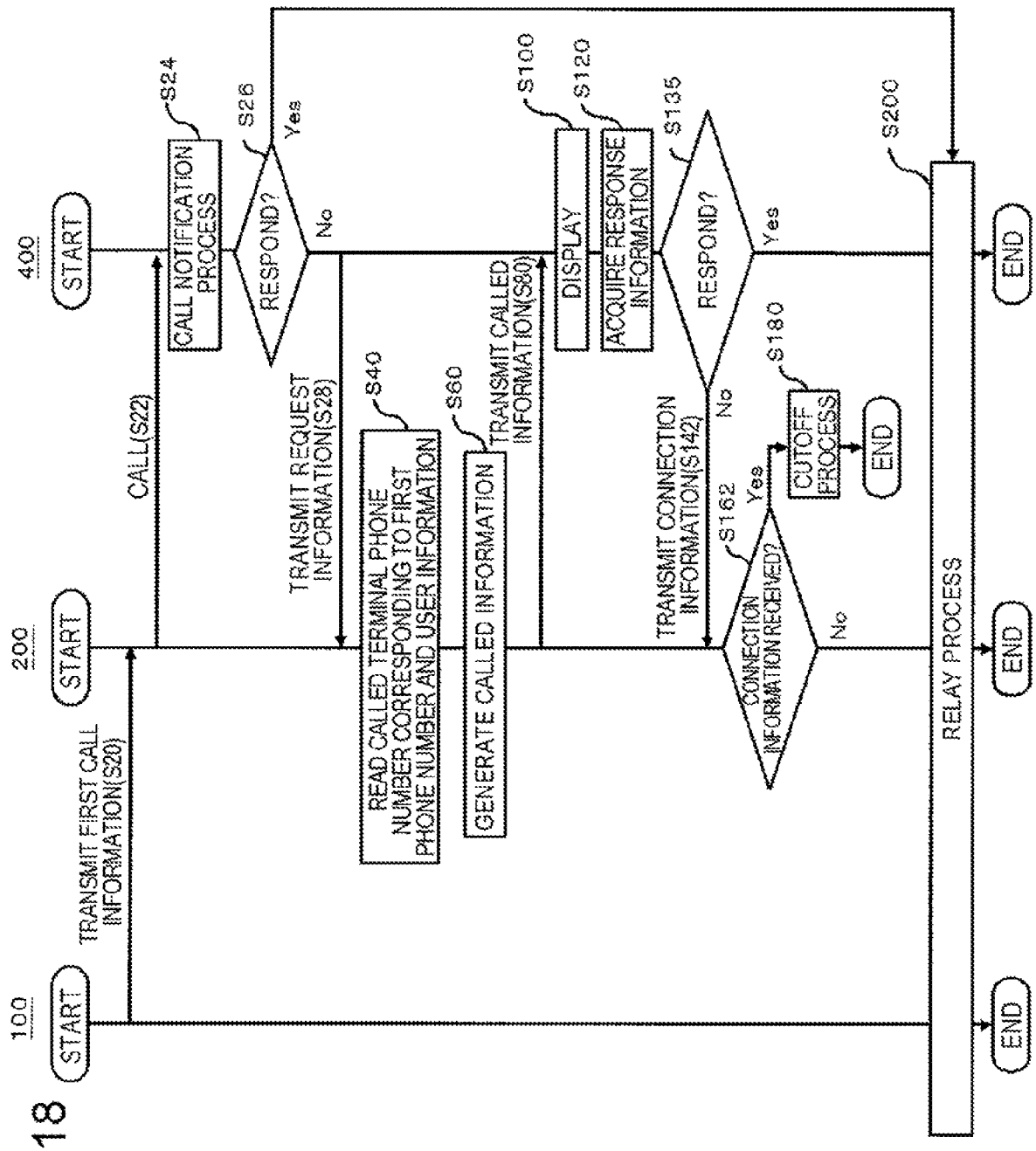
FIG. 18 is a flowchart illustrating the operation of a relay processing system according to an embodiment of the invention.

FIG. 18 is a flowchart illustrating the operation of the relay processing system 10 according to this embodiment of the invention, and corresponds to FIG. 15 according to the third embodiment. The operation illustrated in the drawing is equal to the operation illustrated in FIG. 15 except for the followings.

Firstly, when the first call information is received from the calling terminal 100, the relay processing unit 210 of the relay processing device 200 calls the called terminal 400 to establish the phone call between the calling terminal 100 and the called terminal 400 (step S22). When the call from the relay processing device 200 is received, the call processing unit 440 of the called terminal 400 makes the call notification processing unit 460 perform the call notification process (step S24).

When responding to the call from the relay processing device 200, that is, when responding to the call from the calling terminal 100 ("Yes" in step S26), the user inputs information for responding to the call. In this case, the call processing unit 440 and the relay processing unit 210 of the relay processing device 200 establish the phone call between the calling terminal 100 and the called terminal 400 (step S200).

Further, when the user does not respond immediately to the call from the relay processing device 200, that is, to the call from the calling terminal 100 ("No" in step S26), the request information transmission unit 470 transmits the request information to the called information transmission unit 230 of the relay processing device 200 (step S28). For the transmission of the request information through the request information transmission unit 470 and the response through the called information transmission unit 230 (step S80), for example, HTTP may be used.

The processes in steps S40 to S120 are equal to those according to the third embodiment of the invention. When the response information acquired in step S120 indicates the response to the call ("Yes" in step S135), the called terminal 400 does not transmit the connection information, but responds to the call from the relay processing device 200 in the same manner as in step S26 since the calling has already been made from the relay processing device 200 to the called terminal 400 in step S22. Accordingly, the relay process is established (step S200).

Further, in the case where the response information indicates the rejection of the call ("No" in step S135), the called terminal 400 transmits the connection information (step S142). When the connection information is received ("Yes" in step S162), the relay processing unit 210 of the relay processing device 200 cuts off the communication with the calling terminal 100, and cancels the call to the called terminal 400 (step S180). In this embodiment of the invention, in the same manner as in FIG. 5 or 6 according to the first embodiment of the invention, the called information may be transmitted by SNS or e-mail.

Even in this embodiment of the invention, the same effect as in the third embodiment of the invention can be obtained. Further, when the user has selected to respond to the call in step S26, it is possible to shorten the time from the call of the calling terminal 100 to the start of the phone call.

Although the embodiments of the invention has been described with reference to the drawings, they are exemplary in the present invention, and thus various configurations may be adopted in addition to those as described above. For example, in the above-described embodiments of the invention, the processing options with respect to the call from the calling terminal 100 are only "response" and "rejection". However, such options may include "hold", "audio response", and the like. When the relay processing device 200 is interpreted as a multifunctional private branch exchange (PBX), for example, in the relay process (step S200) of FIG. 18, the options can be realized by including necessary information in the request information transmitted in step S28 and calling a necessary function based on this information. When increasing the options in the first and second embodiments, it is sufficient when phone numbers for receiving the second call information from the called terminal 400 to the relay processing device 200 are prepared as, many as the number of options as the connection information.

This application is based on Japanese Patent Application (No. 2009-023003) filed on Feb. 3, 2009, the disclosure of which is incorporated herein by reference in its entirety.

The invention claimed is:

1. A communication terminal making a phone call with a calling terminal through a relay processing device and capable of performing both voice communication and data communication, in which the calling terminal uses a first phone number of the relay processing device as a phone number of the communication terminal, the communication terminal comprising:
a called information reception unit receiving called information that includes calling terminal specific information that specifies the calling terminal from the relay processing device through data communication;
a notification unit notifying a user about the calling terminal specific information;
a response information acquisition unit acquiring response information from the user indicating whether or not to accept a call from the calling terminal;
a connection information transmission unit transmitting connection information, which indicates whether or not to connect the phone call with the calling terminal, to the relay processing device based on the response information;
a call processing unit receiving call information for establishing the phone call between the relay processing device and the calling terminal before the called information reception unit receives the called information;
a call notification processing unit notifying the user that the call processing unit has received the call information; and
a request information transmission unit transmitting request information for requesting the called information to the relay processing device, when a response information acquisition unit does not acquire the response information before a predefined time is elapsed from the time at which the call processing unit receives the call information,
wherein the called information reception unit acquires the called information after the call notification processing unit performs the notifying,
wherein the connection information transmission unit transmits the connection information to the relay processing device through data communication.

2. The communication terminal according to claim 1, wherein the connection information is a second phone number and a third phone number of the relay processing device, and
the connection information transmission unit calls the relay processing device by using the second phone number when the response information indicates an acceptance of the call from the calling terminal, and calls the relay processing device by using the third phone number when the response information indicates a non-acceptance of the call from the calling terminal.

3. A relay processing system comprising:
a called terminal; and
a relay processing device relaying a phone call from a calling terminal to the called terminal,
wherein the calling terminal uses a first phone number of the relay processing device as a phone number of the called terminal, and the called terminal is capable of performing both voice communication and data communication,
wherein the relay processing device includes:
a phone number storage unit storing the first phone number and called terminal specific information that specifies the called terminal so as to correspond to each other;
a relay processing unit receiving first call information including the first phone number and a phone number of the calling terminal from the calling terminal; and
a called information transmission unit reading the called terminal specific information from the phone number storage unit by using the first phone number included in the first call information, and performing data communication of called information, which includes calling terminal specific information that is specified by the phone number of the calling terminal as information that specifies the calling terminal, with the called terminal by using the called terminal specific information,
wherein the called terminal includes:
a called information reception unit receiving the called information from the relay processing device through data communication;
a notification unit notifying a user about the calling terminal specific information included in the called information;
a response information acquisition unit acquiring response information from the user indicating whether or not to accept a call from the calling terminal;
a connection information transmission unit transmitting connection information, which indicates whether or not to connect the phone call with the calling terminal, to the relay processing device based on the response information;
a call processing unit receiving call information for establishing the phone call between the relay processing device and the calling terminal before the called information reception unit receives the called information;

a call notification processing unit notifying the user that the call processing unit has received the call information; and a request information transmission unit transmitting request information for requesting the called information to the relay processing device, when a response information acquisition unit does not acquire the response information before a predefined time is elapsed from the time at which the call processing unit receives the call information, wherein the called information reception unit acquires the called information after the call notification processing unit performs the notifying, wherein the connection information transmission unit transmits the connection information to the relay processing device through data communication, wherein the relay processing device further includes a connection information reception unit receiving the connection information, and the relay processing unit of the relay processing device connects the phone call between the called terminal and the calling terminal or cuts off the connection with the calling terminal according to the connection information.

4. A calling method in which a communication terminal makes a phone call with a calling terminal through a relay processing device, and is capable of performing both voice communication and data communication, and the calling terminal uses a first phone number of the relay processing device as a phone number of the communication terminal, the calling method comprising:

receiving, by the communication terminal, called information that includes calling terminal specific information that specifies the calling terminal from the relay processing device through data communication;

notifying, by the communication terminal, a user about the calling terminal specific information included in the called information;

acquiring, by the communication terminal, response information from the user indicating whether or not to accept a call from the calling terminal, transmitting, by the communication terminal, connection information, which indicates whether or not to connect the phone call with the calling terminal, to the relay processing device based on the response information;

receiving, by a call processing unit, call information for establishing the phone call between the relay processing device and the calling terminal before the called information reception unit receives the called information;

notifying, by a call notification processing unit, the user that the call processing unit has received the call information; and transmitting, by a request information transmission unit, request information for requesting the called information to the relay processing device, when a response information acquisition unit does not acquire the response information before a predefined time is elapsed from the time at which the call processing unit receives the call information, wherein the called information is acquired by the called information reception unit after the call notification processing unit performs the notifying, and wherein the connection information is transmitted by a connection information transmission unit to the relay processing device through data communication.

5. A non-transitory computer readable media which records a program for use in a communication terminal that makes a phone call with a calling terminal through a relay processing device, in which the communication terminal can perform both voice communication and data communication, and the calling terminal uses a first phone number of the relay processing device as a phone number of the communication terminal, the program making the communication terminal realize the functions of:

receiving called information that includes calling terminal specific information that specifies the calling terminal from the relay processing device through data communication;

notifying a user about the calling terminal specific information included in the called information;

acquiring response information from the user indicating whether or not to accept a call from the calling terminal;

transmitting connection information, which indicates whether or not to connect the phone call with the calling terminal, to the relay processing device based on the response information;

receiving call information for establishing the phone call between the relay processing device and the calling terminal before a called information reception unit receives the called information;

notifying the user that a call processing unit has received the call information; and transmitting request information for requesting the called information to the relay processing device, when a response information acquisition unit does not acquire the response information before a predefined time is elapsed from the time at which the call processing unit receives the call information, wherein the called information is acquired after performing the notifying the user that the call processing unit has received the call information, and wherein the connection information is transmitted to the relay processing device through data communication.

* * * * *